United States Patent [19]

Blum et al.

[11] Patent Number: 4,786,676

[45] Date of Patent: * Nov. 22, 1988

[54] CROSSLINKABLE POLYMERIC COMPOSITIONS WHICH HAVE A LONG SHELF LIFE WHEN IN THE FORM OF AN AQUEOUS SOLUTION OR DISPERSION, THEIR PREPARATION AND THEIR USE

[75] Inventors: Rainer Blum, Ludwigshafen; Rolf Osterloh, Gruenstadt; Gerhard Neubert, Battenberg; Gerhard Auchter, Mannheim, all of Fed. Rep. of Germany

[73] Assignee: BASF Aktiengesellschaft, Fed. Rep. of Germany

[ * ] Notice: The portion of the term of this patent subsequent to Sep. 6, 2005 has been disclaimed.

[21] Appl. No.: 917,519

[22] Filed: Oct. 10, 1986

[30] Foreign Application Priority Data

Oct. 11, 1985 [DE] Fed. Rep. of Germany ....... 3536261

[51] Int. Cl.$^4$ ............................................... C08F 2/16
[52] U.S. Cl. .................................. 524/460; 525/327.6; 525/328.6; 525/328.7; 525/327.9; 525/376
[58] Field of Search ...................... 524/460; 525/327.6, 525/328.6, 328.7, 327.9, 376

[56] References Cited

U.S. PATENT DOCUMENTS

| | | | |
|---|---|---|---|
| 3,858,510 | 1/1975 | Kai et al. .............................. | 101/395 |
| 4,171,413 | 10/1979 | Hartman et al. ..................... | 525/329 |
| 4,191,838 | 3/1980 | Merger et al. ....................... | 560/205 |
| 4,210,565 | 7/1980 | Emmons .............................. | 525/376 |
| 4,226,007 | 10/1980 | Duenser ........................... | 24/20 EE |
| 4,250,070 | 2/1981 | Ley et al. ........................... | 260/29.6 |

Primary Examiner—Joseph L. Schofer
Assistant Examiner—Peter D. Mulcahy
Attorney, Agent, or Firm—Keil & Weinkauf

[57] ABSTRACT

Polymeric compositions which undergo crosslinking after drying at room temperature or elevated temperatures and are dissolved or dispersed in water are prepared by reacting polymeric organic compounds containing carbonyl and carboxyl groups with polyhydrazides in the presence of monoketones or monoaldehydes and are dissolved or dispersed in water by partially or completely neutralizing the carboxyl groups.

They are useful as crosslinking agents and as binders for coatings on sheet-like substrates.

5 Claims, No Drawings

CROSSLINKABLE POLYMERIC COMPOSITIONS WHICH HAVE A LONG SHELF LIFE WHEN IN THE FORM OF AN AQUEOUS SOLUTION OR DISPERSION, THEIR PREPARATION AND THEIR USE

The present invention relates to polymeric compositions which have a long shelf life when in the form of an aqueous solution or dispersion and undergo crosslinking after drying at room temperature or elevated temperatures, processes for their preparation, and their use.

From a number of patent applications and publications describing the preparation and use of polymeric hydrazides, it is clear that there is a desire to use hydrazides and polyhydrazides and other polymeric hydrazine derivatives industrially, for example for adhesives and sealants or decorative and protective coatings etc. because these compounds permit a wide variety of reactions.

U.S. Pat. No. 4,171,413 describes the preparation of polyacrylate hydrazides and points out the difficulty of obtaining hydrazine-free polyacrylate hydrazides by reacting polyacrylates with hydrazine, since the products undergo premature gelling at the high temperature necessary for achieving as complete a conversion as possible.

European Pat. No. 0,003,516 (U.S. Pat. No. 4,250,070 is an equivalent patent) describes aqueous polyacrylate dispersions which, in the aqueous phase, contain water-soluble hydrazides and added heavy metal ions. The addition of heavy metal ions prevents the formation of free hydrazine from the hydrazides. The hydrazides used must be hydrazine-free. The methods used to obtain hydrazine-free hydrazides or hydrazine-free hydrazide solutions are not stated.

Despite the advantages mentioned in these publications of using hydrazides and polyhydrazides or polymeric hydrazide derivatives, such products are not used very widely in industry.

The principal obstacle is that hydrazine is highly toxic and carcinogenic, i.e. for industrial use, such products must not contain any free hydrazine and extreme and expensive safety precautions are necessary.

Where the problem of free hydrazine in formulations for coating agents, adhesives and sealants is mentioned in the literature, it is in terms of pointing out that hydrazine is toxic and the content of free hydrazine should be kept low. U.S. Pat. No. 4,171,413 proposes a distillative method which is said to permit a residual hydrazine content of less than 1% in hydrazinolysis products of polyacrylates.

Because hydrazine is presumed to be potentially carcinogenic, a residual hydrazine content is completely unacceptable for many applications.

Another obstacle to the use of polymeric hydrazides and monomeric polyhydrazides from solutions, particularly in the field of coating agents, adhesives and sealants, is the tendency of such solutions to gel as a result of the formation of hydrogen bridges or other self-crosslinking reactions, or to increase in viscosity on storage to an extent which cannot be tolerated for practical use.

It is an object of the present invention to obtain virtually completely hydrazine-free systems which have a long shelf life when in the form of aqueous solutions or dispersions but nevertheless possess the typical polyhydrazide crosslinking functions stated in the cited literature and others familiar to the skilled worker, particularly for use in the field of coating agents, adhesives and sealants.

We have found, surprisingly, that this object is achieved by the novel polymeric compositions, which have a long shelf life in monoketone-containing and/or monoaldehyde-containing aqueous solutions or dispersions and undergo crosslinking spontaneously, at room temperature or at slightly elevated temperatures, when the solutions or dispersions are dried after some or all of the monoketones and/or monoaldehydes have been evaporated off, and whose crosslinking principle is based on the reaction of hydrazide and/or hydrazone and/or hydrazinocarbinol groups with carbonyl groups, the hydrazide, hydrazone and/or hydrazinocarbinol groups being bonded to the polymers by hydrazone and/or hydrazinocarbinol groups. The carbonyl groups may be present on the same polymer chains as the hydrazide and/or hydrazone and/or hydrazinocarbinol groups or on different polymer chains.

The present invention relates to polymeric compositions which have a long shelf life in aqueous solutions or dispersions, undergo crosslinking after dying at room temperature or elevated temperatures, are obtainable by reacting (A) polymeric organic compounds possessing carbonyl and carboxyl groups with (B) polyhydrazides in the presence of (C) monoketones and/or monoaldehydes, and are water-soluble or water-dispersible after partial or complete neutralization.

The particular advantage of the present invention is that, in order to introduce the crosslinking hydrazide structure into the polymers (A), it starts not from hydrazine but from hydrazides, which can be purified beforehand by well known methods of preparative chemistry and hence substantially freed from hydrazine, for example by recrystallization of crystalline hydrazides, e.g. adipic acid bishydrazide, succinic acid bishydrazide or phthalic acid bishydrazide, so that products having a very low hydrazine content are obtained.

The present invention furthermore relates to processes for the preparation of the novel polymeric compositions, where (a) either reaction of components (A) and (B) is carried out in the presence of component (C) in an organic solvent, which may furthermore be an excess of component (C), or in the absence of a solvent, and the resulting product is then partially or completely neutralized and dissolved or dispersed in water, or (b) the polymeric organic compounds (A) are first partially or completely neutralized and dissolved or dispersed in water and the reaction of (A) with component (B) is then carried out in the presence of component (C).

The present invention furthermore relates to the use of the novel polymeric compositions as crosslinking agents for epoxy resins, such as fairly high molecular weight resin-like solid and/or liquid polyepoxides, in particular for epoxy resins dissolved or dispersed in water, as binders for coatings on hard or soft sheet-like substrates, as adhesives and as contact adhesives.

The aqueous solutions or dispersions according to the invention can undergo self-crosslinking if all the carbonyl groups of the polymeric compound (A) have not been reacted with polyhydrazides (B), or the reaction products thus obtained can be used as crosslinking agents.

Further suitable reactants for the novel reaction products are other carbonyl-containing and carboxyl-containing polymers, which may have the same composition as the polymeric substances (A) used for the reaction, or may differ from these.

Regarding the components of the compositions according to the invention, the following may be stated specifically:

Component (A):

Polymeric organic compounds containing carboxyl and carbonyl groups (component A) can be obtained by conventional prior art methods based on various principles. These polymeric organic compounds (A) as such, and that their production, do not form subjects of the present invention. Only examples of such substances are given below. This list is not complete and is intended to serve only as an illustration.

Examples of suitable polymers are those which are prepared by copolymerization of carbonyl-free and carboxyl-free monomers with monomers containing carbonyl and carboxyl groups. The monomers may be used individually or as a mixture of different monomers.

These include copolymers (a) of (meth)acrylates of alcohols of 1 to 20 carbon atoms, such as methyl, ethyl, propyl, n-, iso- and tert-butyl, cyclohexyl, 2-ethylhexyl, decyl, lauryl and stearyl (meth)acrylate, of vinyl esters of carboxylic acids of 1 to 20 carbon atoms, e.g. vinyl formate, acetate, propionate, butyrate, laurate and stearate, of vinyl ethers of 3 to 22 carbon atoms, such as methyl, ethyl, butyl, hexyl and octadecyl vinyl ether, of vinylaromatics of 8 to 12 carbon atoms, such as styrene, methylstyrene, vinyltoluenes, tert-butylstyrene and halostyrenes, of olefins of 2 to 20 carbon atoms, such as ethylene, propylene, n- and isobutylene, diisobutene, triisobutene and oligopropylenes, of vinyl halides, such as vinyl chloride and bromide and vinylidene chloride, and of allyl ethers, allyl alcohols and/or allyl esters, with the concomitant use of (b) copolymerizable carbonyl compounds, for example $\alpha,\beta$-monoolefinically unsaturated aldehydes and/or ketones, such as acrolein, methacrolein, vinyl alkyl ketones, where alkyl is of 1 to 20 carbon atoms, formylstyrene and (meth)acryloxyalkanals and -alkanones, the preparation of which is described in, for example, German Laid-Open Application DOS No. 2, 722,097, N-oxoalkyl(meth)acrylamides, as described in, inter alia, U.S. Pat. No. 4,226,007 and German Laid-Open Applications DOS No. 2,061,213 and DOS No. 2,207,209, e.g. N-3-oxobutylacrylamide and -methacrylamide, N-1,1-dimethyl-3-oxobutyl(meth)acrylamide, diacetone (meth)acrylamide and N-3-oxo-1,1-dibutyl-2-propylhexylacrylamide, as well as acetonyl and diacetone (meth)acrylate or acrylamidopivalaldehyde or mixtures of these comonomers, preferably 3-oxoalkyl (meth)acrylates, N-3-oxoalkyl(meth)acrylamides, methyl vinyl ketone, methacrolein or acrolein, and with (c) copolymerizable carboxyl compounds, in particular $\alpha,\beta$-monoolefinically unsaturated carboxylic acids, e.g. methacrylic acid and/or acrylic acid. Another preferred method of introducing the carboxyl groups is the copolymerization of maleic acid, maleic acid half esters or maleic anhydride, followed by the formation of maleic acid half esters by reaction with alcohols.

For the preparation of the copolymers (A), it is also possible to use monomers containing other functional groups, for example those containing hydroxyl groups, such as hydroxyalkyl (meth)acrylates, e.g. 2-hydroxypropyl acrylate and methacrylate, 2-hydroxyethyl (meth)acrylate and 4-hydroxybutyl (meth)acrylate. Hydroxyl-containing copolymers may also be provided, for example, with the proportion, according to the invention, of carboxyl groups by reaction with dicarboxylic acid anhydrides.

The copolymers (A) generally have a K value of from 10 to 200, preferably from 10 to 80, determined according to DIN 53,726.

The content of carboxyl groups in component (A) should be chosen so that, after partial or complete neutralization, the product is water-dilutable or water-dispersible. The minimum content of carboxyl groups required for this purpose is also dependent on the composition of polymer (A); hydrophobic constituents, such as styrene, require a larger amount of carboxyl groups than more hydrophilic constituents, such as lower acrylates. The copolymers (A) generally have an acid number of about 5–250, preferably 20–100.

The content of carbonyl groups in component (A) should be chosen so that the resulting crosslinking density is matched up with the intended use; for example, in practice, adhesives are crosslinked to a substantially smaller extent than, for example, anticorrosion coatings. The content of carbonyl groups may be expressed in terms of the number of moles of carbonyl groups per 100 g of polymer (A); it is in general 0.01–1.0, preferably 0.05–0.7, mole of carbonyl groups per 100 g.

Component (B):

Examples of suitable polyhydrazides are dihydrazides of organic di- or oligocarboxylic acids, in particular those of 3 to 20 carbon atoms. Examples are malonic, succinic, glutaric, adipic, pimelic, suberic, azelaic, sebacic, undecanedioic, dodecanedioic, tridecanedioic, tetradecanedioic, pentadecanedioic, hexadecanedioic and 2-methyltetradecanedioic dihydrazide, methyl-, ethyl-, propyl-, butyl-, hexyl-, heptyl-, octyl-, 2-ethylhexyl-, nonyl-, decyl-, undecyl- and dodecylmalonic dihydrazide, methyl-, ethyl-, propyl-, butyl-, hexyl-, heptyl- and octylsuccinic dihydrazide, 2-ethyl-3-propylsuccinic and -glutaric dihydrazide, cyclohexanedicarboxylic and cyclohexylmethylmalonic dihydrazide, terephthalic, phenylsuccinic, cinnamylmalonic and benzylmalonic dihydrazide, pentane-1,3,5-tricarboxylic trihydrazide, hex-4-ene-1,2,6-tricarboxylic trihydrazide, 3-cyanopentane-1,3,5-tricarboxylic trihydrazide and dicyanofumaric dihydrazide, as well as di- and oligohydrazides of dimeric and oligomeric unsaturated fatty acids.

Component (A) is generally combined with component (B) in amounts such that the ratio of the number of equivalents of hydrazide groups of component (B) to the number of equivalents of carbonyl groups of component (A) is 0.1 to 1, preferably 0.1 to 0.9.

Component (C):

Suitable components (C) are conventional monofunctional monoketones and monoaldehydes, in particular ketones and/or aldehydes having a boiling point of from 30° to 200° C. in each case, for example aliphatic, cycloaliphatic, aromatic and/or aralphatic ketones and aldehydes, such as acetaldehyde, propionaldehyde, butyraldehyde, benzaldehyde, phenylacetaldehyde and terpene aldehydes, dialkyl ketones such as acetone, methyl ethyl ketone, diethyl ketone, isopropyl methyl ketone, n-propyl methyl ketone, di-isopropyl and di-n-propyl ketone, tert-butyl methyl ketone, isobutyl methyl ketone, sec-butyl methyl ketone and diisobutyl ketone, cycloaliphatic ketones, such as cyclohexanone, and aromatic-aliphatic ketones, such as acetophenone.

Dialkyl ketones having a boiling point of from 50° to 150° C. are preferably used.

Components (A), (B) and (C) are advantageously reacted at elevated temperatures of about 40°–120° C. in order to obtain the desired rapid reaction. It is also advantageous to catalyze this reaction with an acid. In general, the carboxyl groups present in the polymers (A) are sufficient for effecting catalysis, but minor amounts of further catalytic acids may be added, e.g. p-toluenesulfonic acid, phthalic acid and/or phosphoric acid.

The reaction can be carried out in the absence of a solvent but is advantageously effected in solution or dispersion in an organic solvent, in order to permit the generally highly viscous substances to be more easily handled. It is preferable to use water-miscible solvents, for example lower alkanols, diols or etheralkanols. However, it is also advantageous if reactant (C), the number of equivalents of which may be substantially in excess of the number of equivalents of components (A) and (B), is simultaneously used as the solvent or cosolvent. In general, high concentrations of reaction products are desirable, for example solutions or dispersions of more than 60% strength.

After the reaction, the polymers are partially or completely neutralized with basic compounds, for example amines, in particular readily volatile amines, e.g. methylamine, ethylamine, or ethanolamine, in order, for example, to increase the water resistance of the dry coatings; ammonia is preferably used. After the addition of water, generally with vigorous stirring, an aqueous solution or dispersion is obtained.

It is however also possible, after partial or complete neutralization, first to convert the polymers (A) to aqueous solutions and then to carry out the reaction with the components (B) and (C).

After they have been applied to the substrate to be coated, the compositions according to the invention undergo crosslinking after drying, at as low as room temperature; increasing the temperature to, for example, 40°–100° C., accelerates crosslinking (forced drying). The coatings obtained are useful as protective and/or decorative coatings on hard and soft substrates, e.g. metal, leather, paper and/or plastics, as adhesives and contact adhesives on the same substrates and as binders for road marking paints.

I. Preparation of a solution of polymer (A) in a monoketone (C)

125 g of methyl ethyl ketone were heated to 80° C. in a glass reaction vessel. A mixture of 200 g of ethyl hexyl acrylate, 225 g of styrene, 50 g of acrylic acid, 25 g of diacetoneacrylamide and 25 g of tert-butyl perbenzoate was added dropwise to the refluxed ketone in the course of 2 hours; when the addition was complete, the reaction mixture was refluxed for a further hour and then cooled to room temperature. A roughly 80% strength by weight solution of a polymer (A) in a monoketone (C) was obtained.

EXAMPLE 1

The polymer solution prepared as described under I was stirred with 50 g of isoamyl methyl ketone and 13 g of adipic bishydrazide for 2 hours at 65° C. During this procedure, the adipic bishydrazide went into solution. The reaction mixture was cooled to room temperature, after which 78 g of 25% strength by weight ammonia were first stirred in, followed by 800 g of deionized water. This procedure gave a cloudy, roughly 40% strength by weight solution which had a long shelf life, i.e. whose viscosity scarcely changed in the course of 20 days at room temperature.

EXAMPLE 2

40 g of 25% strength by weight ammonia were added to the polymer solution prepared as described under I, after which 50 g of isoamyl ketone and 400 g of deionized water were stirred in. A white, cloudy dispersion resulted. 13 g of adipic bishydrazide were added and the mixture was stirred for 4 hours at 50° C., after which 38 g of 25% strength by weight ammonia and 400 g of water were stirred in one after the other. This procedure gave a cloudy solution of about 40% strength by weight.

II. Testing the novel solutions obtained in Examples 1 and 2

The solutions obtained as described in Examples 1 and 2 were applied onto a number of degreased aluminum sheets by means of a knife coater having a 100 μm gap, the thickness of the resulting dry films being about 35 μm.

Crosslinking was tested by checking the pendulum damping and the behavior toward ethanol.

| | | | Drying | | | |
|---|---|---|---|---|---|---|
| Films from solution according to Example 1 | 1 h. at 25° C. | 1 h. at 25° C. 30 min. at 50° C. | 24 h. at 25° C. | 24 h. at 25° C. 30 min. at 50° C. | 60 h. at 25° C. | 60 h. at 25° C. 30 min. at 50° C. |
| Pendulum hardness$^x$ | 42 | 112 | 67 | 117 | 109 | 120 |
| Ethanol test$^{xx}$ | soluble | slightly swellable | highly swellable | slightly swellable | slightly swellable | slightly swellable |
| Example 2 | | | | | | |
| Pendulum hardness | 36 | 118 | 61 | 122 | 114 | 122 |
| Ethanol test | soluble | slightly swellable | highly swellable | slightly swellable | slightly swellable | slightly swellable |

$^x$Pendulum hardness in second(s) according to DIN 53,157
$^{xx}$A cottonwool ball impregnated with ethanol is placed for 2 minutes on the film being tested and is then removed, and the film is assessed.

The tests show that crosslinking is substantially complete even on storage under relatively mild heat conditions, i.e. 50° C. for 30 minutes; however, complete crosslinking is also achieved at room temperature after about 60 hours.

The solutions described in Examples 1 and 2 can be used, for example, as binders for formulating anticorrosion paints, water-dilutable paints, masonry paints or road marking paints.

We claim:

1. A polymeric composition in the form of an aqueous solution or dispersion having a long shelf life which comprises: the reaction product of
    (A) a polymeric organic compounds containing carboxyl and carbonyl groups, and
    (B) a polyhydrazide, and as a stabilizing agent,
    (C) an alkyl, cycloalkyl, arylalkyl monofunctional monoketone, monoaldehyde or a mixture thereof, the reaction of (A) and (B) having been carried out in the presence of (C);
the carboxyl groups of the reaction product being partially or completely neutralized.

2. The composition of claim 1, wherein component (A) is a polymeric organic compound which is obtained by the copolymerization of (meth)acrylates with copolymerizable ketones or aldehydes or mixtures of these, and copolymerizable carboxylic acids, carboxylic anhydrides or mixtures of these compounds.

3. The composition of claim 1, wherein the ratio of the number of equivalents of the polyhydrazide (component B) to the number of equivalents of carbonyl groups in component A is 0.1 to 1.

4. A process for the preparation of a composition as defined in claim 1, wherein components (A) and (B) are reacted in the presence of component (C), in the absence of or presence of a further solvent, and the resulting reaction product is partially or completely neutralized and dissolved or dispersed in water.

5. A process for the preparation of a composition as defined in claim 1, wherein componant (A) is first partially or completely neutralized and dissolved or dispersed in water, and the reaction of (A) with component (B) is then carried out in the presence of component (C).

* * * * *